United States Patent [19]

Richardson

[11] Patent Number: 5,425,678
[45] Date of Patent: Jun. 20, 1995

[54] ELASTIC JOINT DERAILLEUR

[76] Inventor: Brian E. Richardson, 3445 Oakwood Ct., Morgan Hill, Calif. 95037

[21] Appl. No.: 67,352

[22] Filed: May 26, 1993

[51] Int. Cl.⁶ .......................................... F16H 59/00
[52] U.S. Cl. ................................ 474/82; 474/140; 280/261
[58] Field of Search .......................... 474/78–82, 474/140; 280/238, 261

[56] References Cited

U.S. PATENT DOCUMENTS

| | | | |
|---|---|---|---|
| 3,730,012 | 5/1973 | Juy | 474/82 |
| 3,890,847 | 6/1975 | Dian | 74/217 B |
| 4,199,997 | 4/1980 | Isobe | 74/217 B |
| 4,199,998 | 4/1980 | Isobe | 74/217 B |
| 4,330,137 | 5/1982 | Nagano | 280/238 |
| 4,816,008 | 3/1989 | Leonard | 474/49 x |
| 5,121,962 | 6/1992 | Weber et al. | 297/214 |
| 5,213,549 | 5/1993 | Blanchard | 474/81 |

Primary Examiner—Roger J. Schoeppel

[57] ABSTRACT

A front or rear derailleur for a bicycle comprising a base, an actuating assembly and a generally U-shaped chain guide. The base is a cylindrically shaped portion of flexible material that attaches the derailleur to a host frame member of a bicycle. The actuating assembly includes an actuating arm, two actuating links, a lip, a spring and adjusting screws. The actuating assembly responds to tension from an attached shifting cable, which in turn varies the compression on the spring, forcing a first actuating link to move outwardly from, or inwardly toward, the base. The chain guide, which is integral with the actuating link, moves concomitantly with the first actuating link. The second actuating link is formed between the base and the chain guide, and maintains the chain guide in a position parallel to the host frame member of the bicycle.

32 Claims, 6 Drawing Sheets

ELASTIC JOINT DERAILLEUR

BACKGROUND OF THE INVENTION

1. Field of the Invention

This invention relates generally to bicycle gear changing mechanisms, and more particularly to a bicycle derailleur that has a generally one-piece construction made from molded plastic.

2. Description of the Background Art

Non-encapsulated bicycle derailleurs are exposed to harsh environmental conditions such as road dirt, mud, gravel strikes and salty water. Over time, bicycle use and harsh conditions lead to excessive wear on the derailleur, which then requires replacement. As a derailleur may need to be replaced many times over the useful life of a bicycle, cost becomes an important factor in its construction.

U.S. Pat. No. 4,330,137 discloses a bicycle derailleur that is attached to a bottom bracket of a bicycle instead of being attached to the bicycle seat tube, which is the customary attachment point. The derailleur comprises at least three different linkage members that are pivotally connected to each other and move in relation with each other to position a chain guide. The multiple linkages comprising the derailleur require additional hardware for complete assembly and the unit will need to be painstakingly adjusted when incorporated into a bicycle. The additional materials and increased labor during assembly add to the cost of the derailleur.

U.S. Pat. Nos. 4,199,997 and 4,199,998 both teach a multi-linkage derailleur, where the links must pivot in relation to each other in order to move a chain guide in a direction perpendicular to the bicycle seat post member. The derailleur construction is complex and does not lend itself to a one or two piece construction, thus requiring fine adjustment and increased manufacturing costs.

U.S. Pat. No. 3,890,847 discloses an encapsulated derailleur device which addresses the problem of stretching or breaking the control cable if an operator attempts to shift gears while the bicycle is stationary. The derailleur is quite complex, incorporating a lever, shifting arm, adjusting screws and a flexible spring enclosed within a housing. The great number of parts comprising this portion of the derailleur increases the manufacturing costs.

SUMMARY OF THE INVENTION

The present invention is a front or rear derailleur for a bicycle formed as a one-piece trait from molded plastic that comprises a base, an actuating assembly and a generally U-shaped chain guide. The base is a cylindrically shaped portion of flexible material that attaches the derailleur to a bicycle by clamping to a host frame member of the bike. The actuating assembly includes an actuating arm, two actuating links, a lip, a spring and adjusting screws. The actuating assembly responds to tension from an attached shifting cable, which in turn compresses the spring and forces a first actuating link to move outwardly, away from the base. An upper portion of the outer member of the chain guide is integral with the actuating link, and thus the chain guide is moved outwardly along with the movement of the first actuating link. The second actuating link, formed from the base and integral with the lower portion of the inner member of the chain guide, maintains the chain guide in a position parallel to the host frame member of the bicycle.

DETAILED DESCRIPTION OF THE PREFERRED EMBODIMENT

Figure 1:
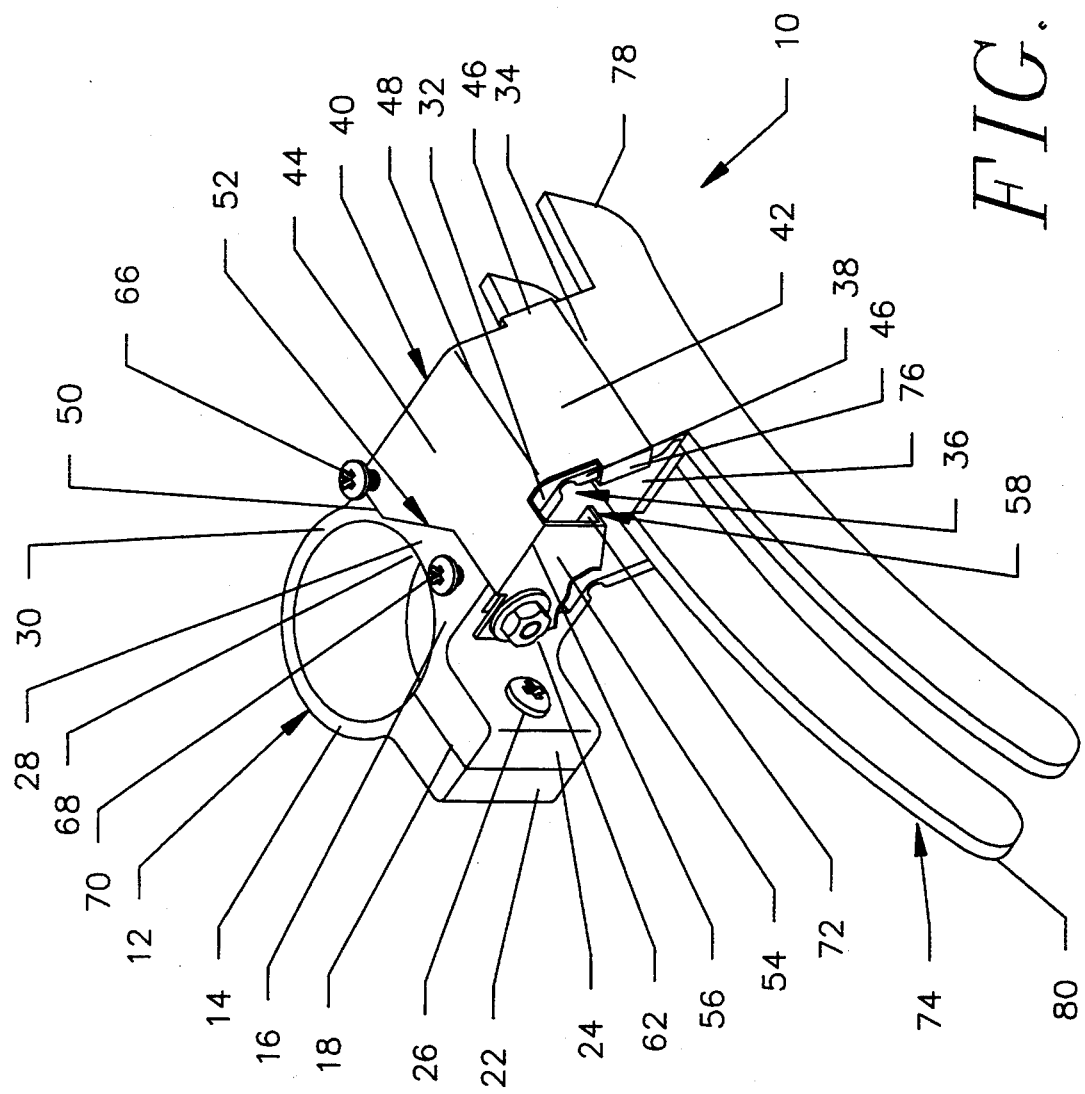
FIG. 1 is a perspective view of a front or rear derailleur in accordance with the present invention.

Referring now to FIG. 1, a perspective view is illustrated of a derailleur 10 in accordance with the present invention. A cylindrically shaped base 12 comprising two clamping arms 14 and 16 having a longitudinal slit opening 18 therebetween, provides a means for clamping derailleur 10 to a host frame member of a bicycle. Base 12 is comprised of a flexible material which allows clamping arms 14 and 16 to be separated, creating an opening 18 wide enough to slip the base 12 around a host frame member. Following the engagement of base 12 and the frame member, the base's flexible material resiliently returns to a generally cylindrical form, securely gripping the frame member. The opening end of each clamping arm 14 and 16 includes a flange, 22 and 24 respectively. After the derailleur 10 is affixed to the host frame member, a screw 26 securely fastens flanges 22 and 24 together to ensure a tight connection between derailleur 10 and the host frame member.

Base 12 further includes a rigid lip 28 extending horizontally outwardly from an upper portion 30 of base 12. Base 12 is constructed of elastic polymer or other flexible material. At an outboard end 32 of lip 28, a first actuating link 34 is formed. A first elastic joint 36 allows the upper end 38 of first actuating link 34 to be bendable between a first position that is perpendicular to the lip 28, and a second position that is at an angle less than 90 degrees to the first angle. First elastic joint 36 is formed by a reduction in cross section of the material between the lip's outboard end 32 and the first actuating link 34.

An actuating arm 40 comprised of a very rigid material includes a V-shaped arm having a first portion 42 and a second portion 44, with an approximately 45 degree bend or 135 degree angle therebetween. First portion 42 adjoins the first actuating link 34 by fastening brackets 46 that engage the first actuating link 34 proximate first elastic joint 36, just prior to the convergence 48 of first portion 42 and second portion 44. The second portion 44 is positioned above lip 28 and is separate therefrom. The distal end 50 of second portion 44 includes a shallow notch 52 that cuts away approximately half of the width of second portion 44. A U-shaped spring member 97 (illustrated with reference to FIG. 2 below) separates second portion 44 from lip 28 and provides tension therebetween. Chain guide 74 is molded as part of base 12 in the preferred embodiment; however, the chain guide can alternatively be manufactured separately of metal or other rigid material and attached to a bridge member 76 which is molded as part of base 12.

A side portion 54 is formed from the notched elongated side 56 of the second portion 44 and is disposed perpendicular thereto. A leg 58 is formed at distal end 50 of side portion 54 and is disposed at a right angle thereto. The side portion 54 further includes hardware 62 designed to attach a bicycle shifting cable (not shown) to derailleur 10 and disposed upon side portion 54 proximate shallow notch 52 in second portion 44.

An outer stop adjusting screw 66 is threaded through an aperture in second portion 44 proximate distal end 50 and adjacent shallow notch 52. The outer stop adjusting screw 66 defines the maximum compression on spring member 97 by limiting the downward movement of actuating arm 40 as the screw's stem end 114 (illustrated with reference to FIG. 6 below) engages top surface 68. An inner stop adjusting screw 70, threaded through an aperture in lip 28 proximate the second portion's shallow notch 52, limits the amount of separation between the second portion 44 and the lip 28. As compressive forces are released, the resilience of spring member 97 causes the second portion 44 and the lip 28 to separate. The amount of this separation is limited by the inner stop adjusting screw's stem end 114 which engages the inner surface 72 of leg 58.

Chain guide 74 is comprised of a generally U-shaped member of rigid material having a bridge member 76 and two parallel side members—an outer side member 78 and an inner side member 80. A second elastic joint 82 joins the lower end 84 of first actuating link 34 with the outer side member 78 at the intersection 86 between the outer side member 78 and the bridge member 76.

Figure 2:
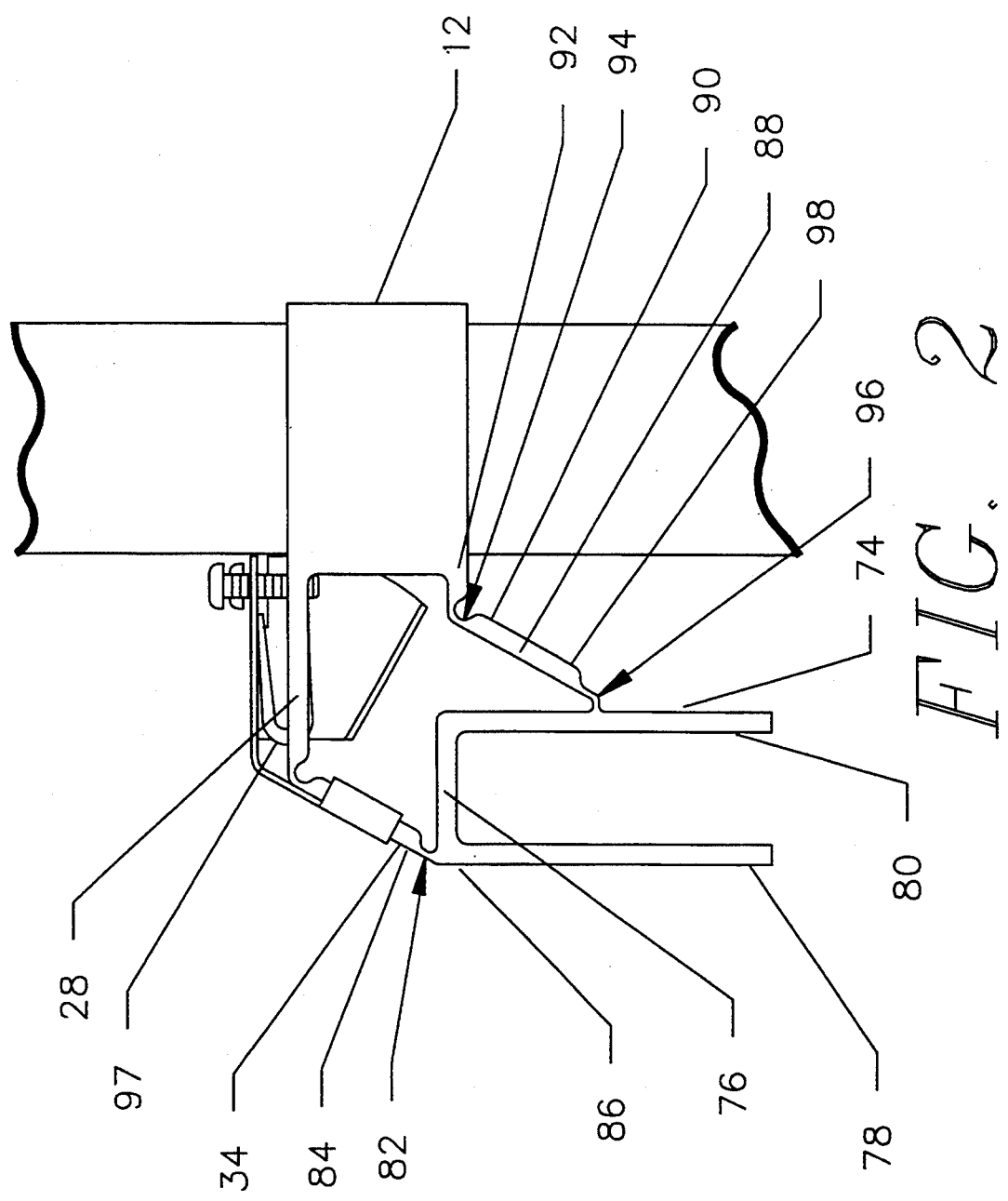
FIG. 2 is a front view of the derailleur of the present invention attached to a portion of the bicycle seat post tube.

Referring now also to FIG. 2, which is a front view of the derailleur of FIG. 1, a second elastic joint 82 allows the angle between the first actuating link's lower end 84 and intersection 86 to be varied as chain guide 74 is moved in a horizontal direction. A second actuating link 88 is formed between derailleur's base 12 and inner side member 80. An upper end 90 of the second actuating link 88 is joined to a lower portion 92 of the derailleur's base 12 via a third elastic joint 94, created by a reduction in cross section of the material joining the second actuating link 88 with the base 12. The third elastic joint 94 allows the second actuating link 88 to be positioned vertically or at an angle of approximately 60 degrees from vertical. A fourth elastic joint 96 is similarly formed between the inner side member 80 of chain guide 74 and the lower end 98 of the second actuating link 88. The combination of second actuating link 88, base 12, bridge member 76, and first actuating link 34, forms what is conventionally referred to as a four-bar linkage.

Figure 3:
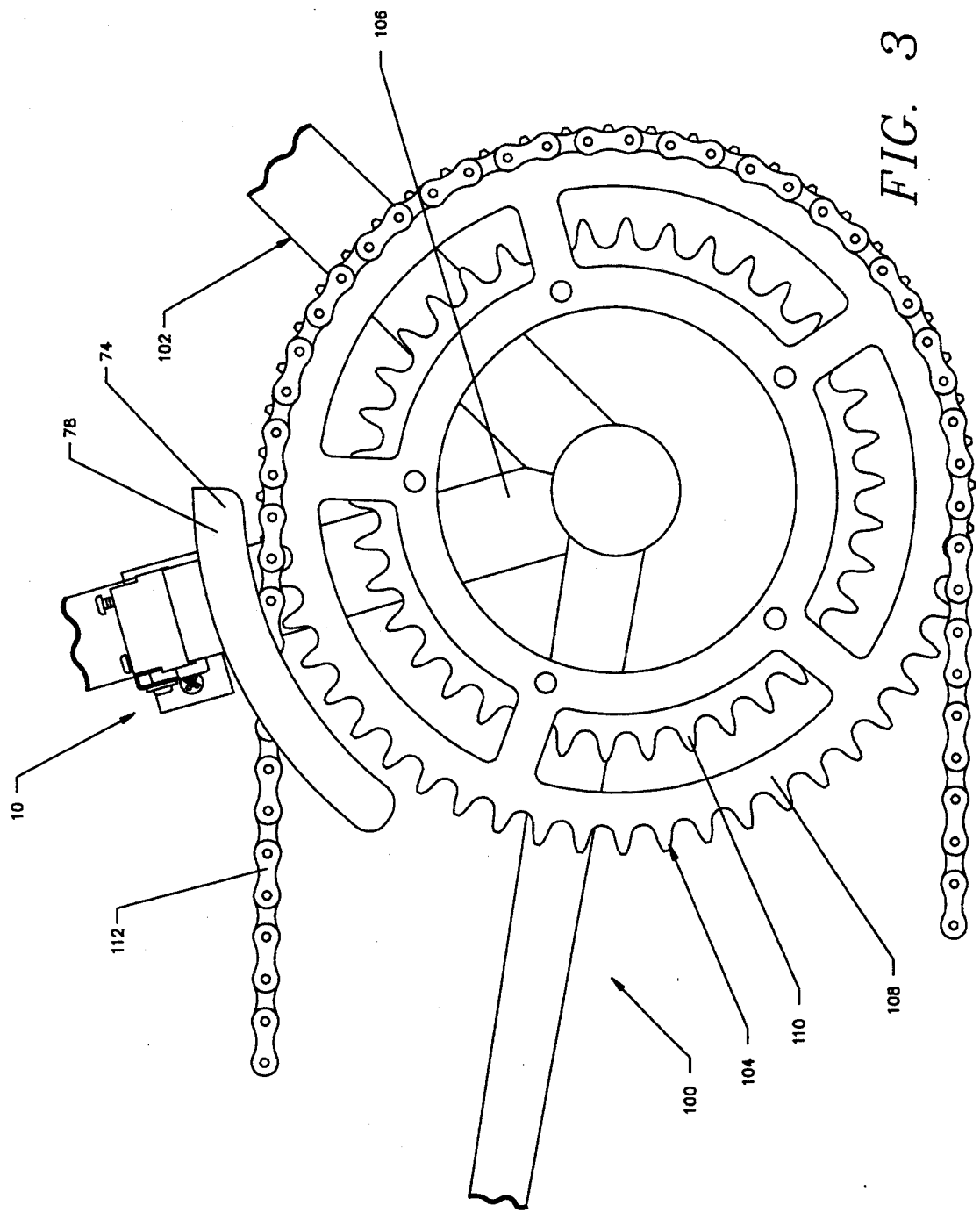
FIG. 3 is a side view of a portion of a bicycle, illustrating the location of the derailleur (when used as a front derailleur) with respect to the bicycle frame, and chain and sprocket assembly.

Referring now to FIG. 3, a side view of a portion of a bicycle 100, shows the location of derailleur 10 with respect to bicycle frame 102, and chain and sprocket assembly 104. In the illustration, a front derailleur 10 is shown engaged to the bike's seat post tube 106 which is acting as the host frame member. The chain and sprocket assembly 104 is comprised of an outer sprocket 108 rotatably attached to bicycle frame 102, and an inner sprocket 110 that is smaller in diameter than the outer sprocket 108 and is disposed between outer sprocket 108 and bicycle frame 102. The derailleur 10 is attached to the seat post tube 106 above the height of chain 112, so that the chain guide 74 of the derailleur 10 can most effectively interact with bicycle chain 112. The derailleur 10 is positioned such that bicycle chain 112 is disposed between the outer side member 78 and the inner side member (not visible) of chain guide 74. Thus, the horizontal component of movement of the chain guide 74 displaces the bicycle chain 112 as well.

Figure 4:
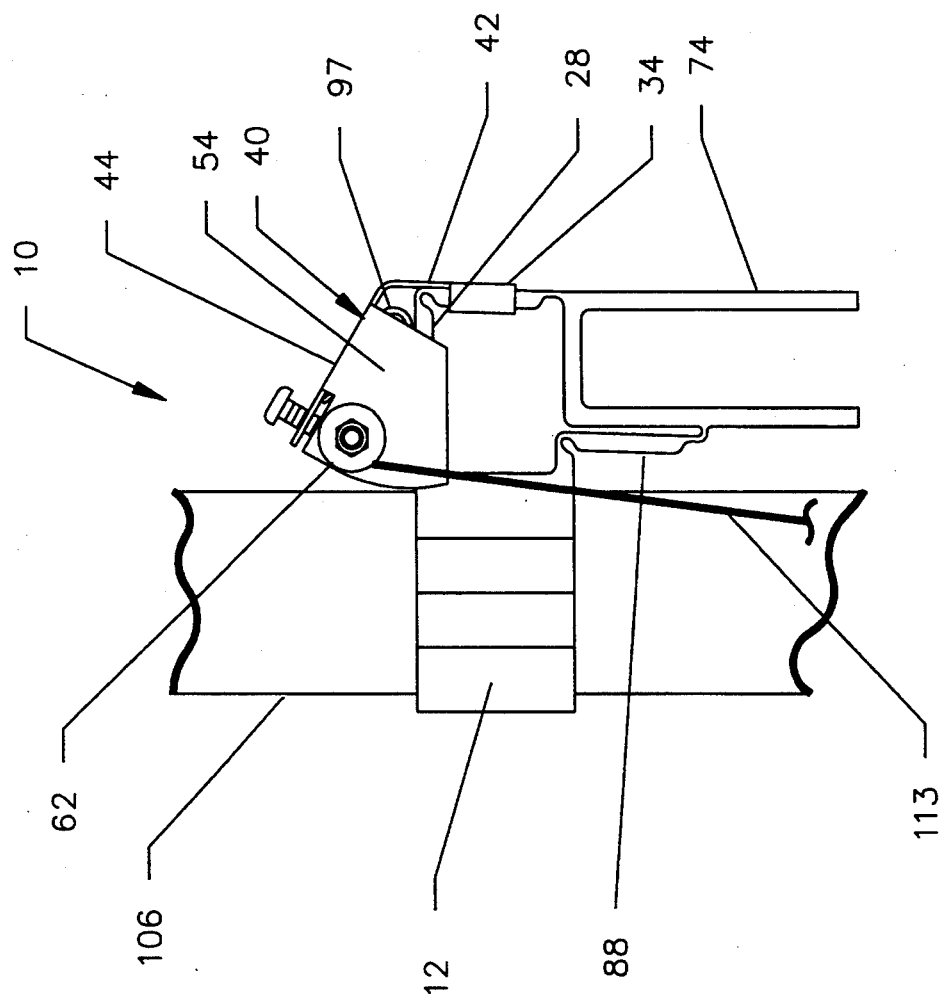
FIG. 4 is a rear view of the derailleur of the present invention attached to a portion of the bicycle seat post tube, illustrating the derailleur in a decompressed disposition.
Figure 5:
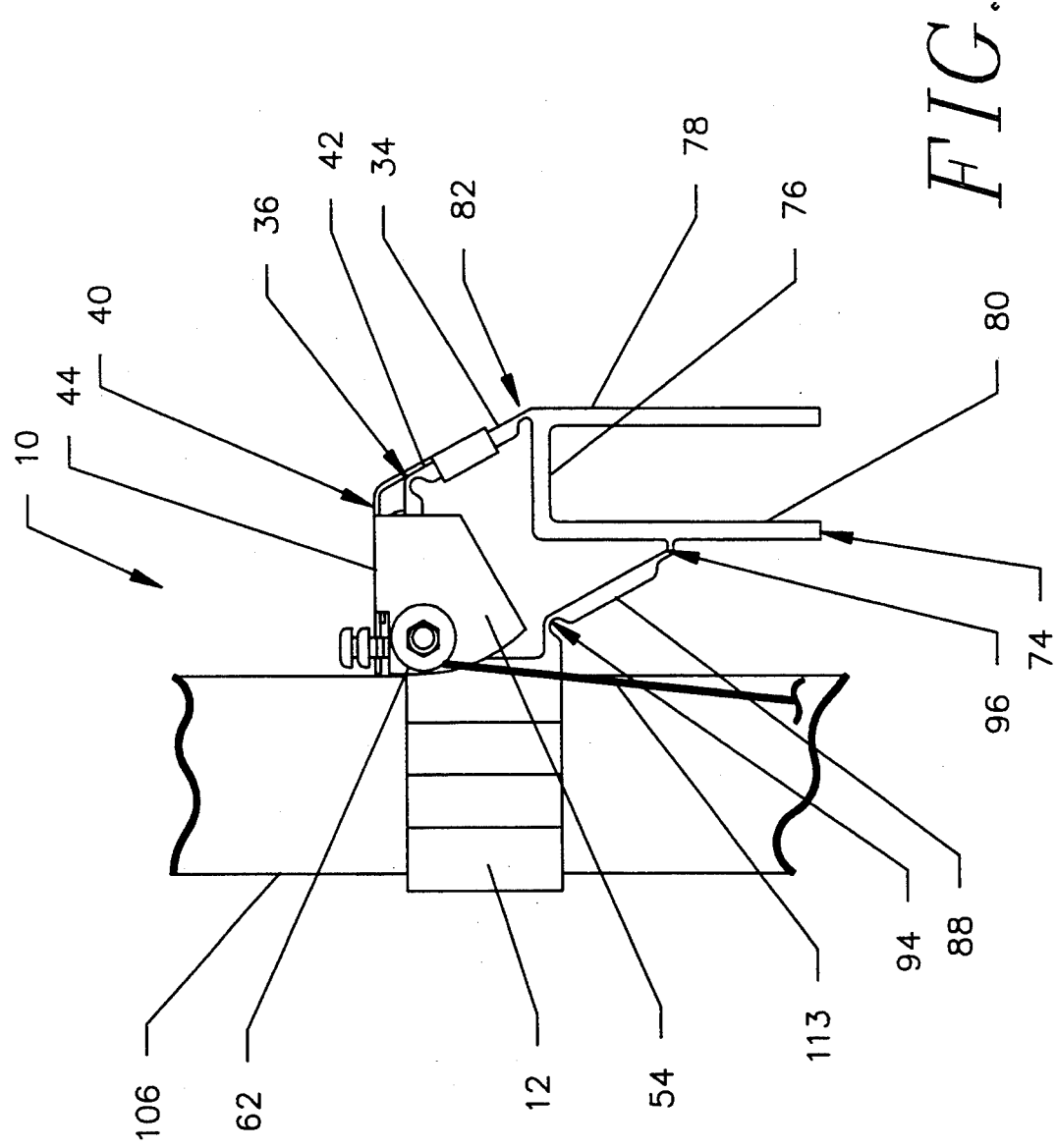
FIG. 5 is a rear view of the derailleur of the present invention attached to a portion of the bicycle seat post robe, illustrating the derailleur in a compressed disposition.

Referring now to FIGS. 4 and 5, rear views of derailleur 10 are shown, illustrating the derailleur 10 in two different positions of operation. Operating derailleur 10 to change the chain position on a bike, a bicycle rider moves a lever located elsewhere on the bike within his reach, to produce a change in the tension on a shifting cable 113. Shifting cable 113 is attached to the derailleur's actuating arm 40, such that changes in tension on the cable will cause changes in the disposition of derailleur 10.

For example, in FIG. 4, there is little or no tension on shifting cable 113, and thus the disposition of derailleur 10 is determined by the inner stop adjusting screw 70 (not visible). With no tension on shifting cable 113, resilient spring member 97 is decompressed, maintaining separation between the actuating arm's second portion 44 and lip 28. The separation of these members is limited by the engagement of the inner stop adjusting screw's stem end 114 (described more fully in reference to FIG. 6, below) with the leg's inner surface. In the fully decompressed disposition shown in FIG. 3, the first actuating link 34 and the second actuating link 88 are generally vertically oriented, parallel with the longitudinal axis of seat post robe 106, and chain guide 74 is in an inboard position. In this position, chain guide 74 will have placed the bike chain over an innermost sprocket 110 (shown in FIG. 3).

In FIG. 5, tension on shifting cable 113 has been applied and the derailleur 10 is in its compressed position with the chain disposed in the outermost sprocket 108 (shown in FIG. 3). Shifting cable 113 is affixed to hardware 62 on side portion 54 of actuating arm 40, and tension from the cable is transferred to the actuating arm causing the actuating arm's second portion 44 to be disposed in a downward position. The position of the second portion 44 causes a corresponding disposition of the first portion 42 as the two segments are in a rigid relationship. The first portion 42 is rotated about the first elastic joint 36, bringing the first actuating link 34 (integral therewith) in conformity towards the horizontal. As the first actuating link 34 is moved from its vertical position to an angle thereto, chain guide 74, integral with first actuating link 34 and bendable at second elastic joint 82, is caused to move outwardly in a generally horizontal direction. The second actuating link 88 follows the movement of chain guide 74, bending at the third and fourth elastic joints, 94 and 96 respectively, and provides a means for maintaining the disposition of chain guide 74 in a parallel relationship with seat post tube 106.

Figure 6:
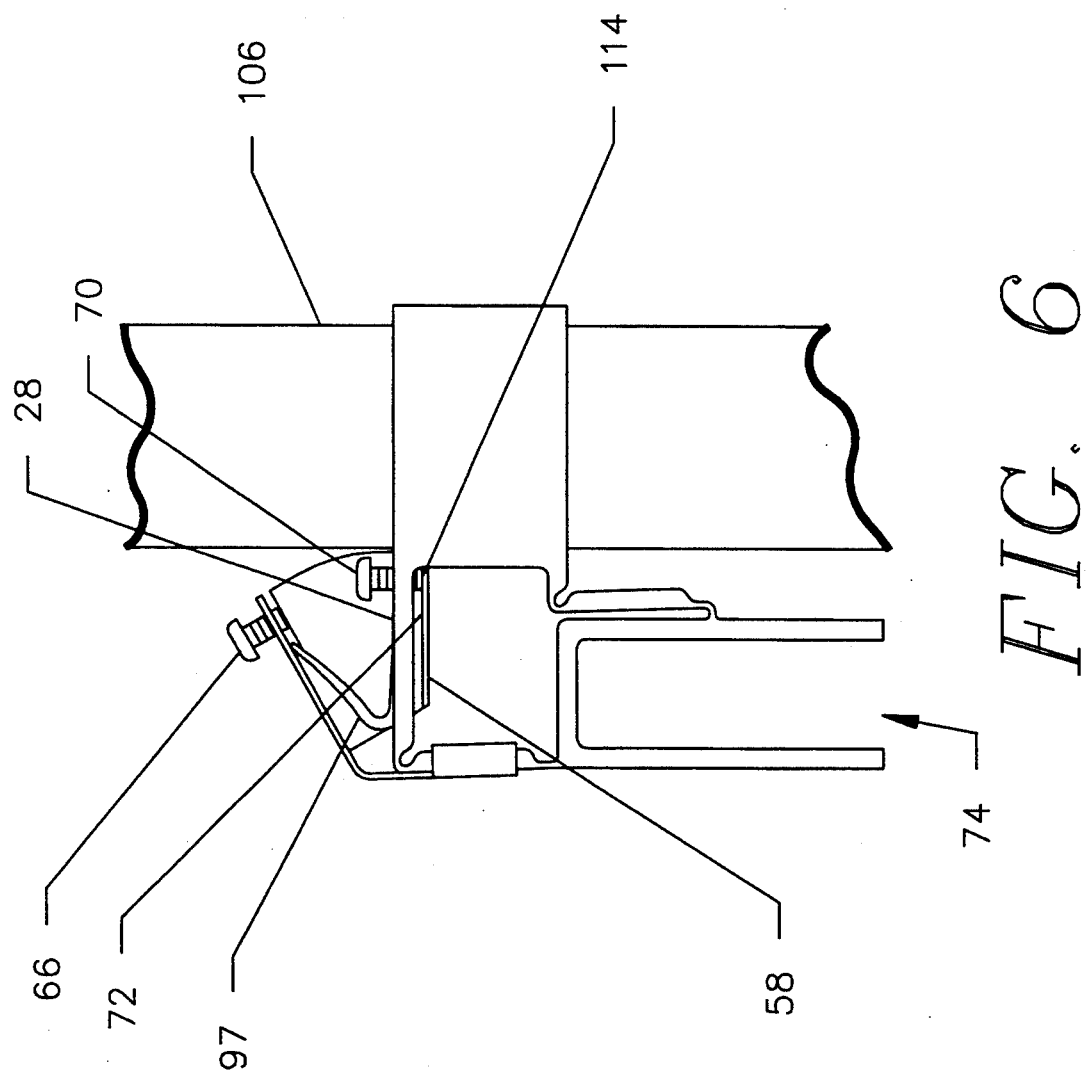
FIG. 6 is a front view of the derailleur of the present invention attached to a portion of the bicycle seat post robe, illustrating the operation of the spring and the adjusting screws for the derailleur in a decompressed disposition.

Referring now to FIG. 6, front views of derailleur 10 are shown, again illustrating the compression of spring member 97 and the functioning of inner and outer stop adjusting screws 66 and 70. FIG. 6 shows spring member 97 in a decompressed position, limited by inner stop adjusting screw 70. The inner stop adjusting screw's stem end 114 limits the full decompression of spring member 97 by engaging inner surface 72 of leg 58 before the leg's inner surface 72 has hooked the underside 116 of lip 28. Thus, the disposition of chain guide 74 is such that the chain 112 engages the inner sprocket 110.

Contrasting FIG. 2 with the derailleur disposition of FIG. 6, FIG. 2 shows spring member 97 as fully compressed. The compression of spring member 97 (and thus the horizontal travel of chain guide 74) is limited by the interference between the outer stop adjusting screw's 66 stem end and the lip's top surface 68. Spring member 97 is made of conventional spring material or alternatively, could be molded as an integral component of the derailleur body. In an alternative embodiment, spring member 97 can be eliminated by molding base 12 in the decompressed position. By molding base 12 in the decompressed position, the resiliency of elastic joints 36, 82, 94, and 96, acts to resist the deformation of base 12 into the compressed state as tension is applied to cable 113. When tension on cable 113 is released, base 12 resiliently returns to the decompressed position.

The invention has now been explained with reference to specific embodiments. Other embodiments will be apparent to those of ordinary skin in the art in light of this disclosure. For example, although a derailleur in accordance with the present invention has been illustrated in two extreme dispositions, it is anticipated that the derailleur can be used on a multi-sprocketed bicycle and that it can be tensioned to position the chain guide at any interval between the two extremes illustrated. Furthermore, the present invention has been described with respect to front derailleur embodiments. The derailleur works equally well as a rear derailleur, with only minor changes in size, shape and installation location required from the embodiments shown. Therefore, it is not intended that this invention be limited, except as indicated by the appended claims.

What is claimed is:

1. A derailleur for a bicycle comprising:
   means for fastening the derailleur on a bicycle frame, the fastening means including an upper portion and a lower portion;
   means for guiding the movement of a bicycle chain over a plurality of sprockets; and
   means for actuating the movement of the guide means between a first position and a second position, the actuating means including a four bar linkage assembly integral with the fastening means.

2. The derailleur as recited in claim 1 wherein the fastening means comprise a cylindrically shaped base of flexible material including an opening for affixing the base to a bicycle frame member.

3. The derailleur as recited in claim 1 wherein the guide means comprise a chain guide having a first side member, a second side member disposed parallel to the first side member, and a bridge member joining the first and second side members.

4. The derailleur as recited in claim 3 wherein the chain guide is an integral part of the actuating means and is formed therefrom.

5. The derailleur as recited in claim 3 wherein the chain guide is attached to the actuating means.

6. The derailleur as recited in claim 1 wherein the four bar linkage assembly further comprises:
   a first link including the fastening means and a lip integral with the fastening memos, the lip is formed from the upper portion of the fastening means and disposed parallel to a longitudinal axis of the fastening means, the lip is in a fixed position;
   a second link including a member having a first end and a second end, the first end is integral with the lip and rotatable about a first joint formed between the lip and the first end of the second link;
   a third link including a member integral with the fastening means having a first end and a second end, the member is formed from the lower portion of the fastening means and rotatable about a second joint formed between the lower portion of the fastening means and the first end of the member;
   a fourth link having a first end and a second end, the first end is formed from the second end of the second link and rotatable about a third joint formed between the first end of the fourth link and the second end of the second link, the second end is formed from the second end of the third link and rotatable about a fourth joint formed between the second end of the fourth link and the second end of the third link, the fourth link including the guide means.

7. The derailleur as recited in claim 6 wherein the guide means includes a first side member, a second side member disposed parallel to the first side member, and a bridge member joining the first and second side members, the first side member is integral with the second end of the second link and rotatable about a joint formed between the first side member and the second end of the second link, the second side member is integral with the second end of the third link and rotatable about a joint formed between the second side member and the second end of the third link.

8. The derailleur as recited in claim 6 wherein the guide means includes a first guide attachment member having an outer surface, a second guide attachment member disposed normal to the first guide attachment member and having an outer surface, and a chain guide attached to the outer surfaces of the first and second guide attachment members.

9. The derailleur as recited in claim 8 wherein the first guide attachment member is attached to the second end of the second link and rotatable about a joint formed between the first guide attachment member and the second end of the second link, the second guide attachment member is attached to the second end of the third link and rotatable about a joint formed between the second guide attachment member and the second end of the third link.

10. The derailleur as recited in claim 6 wherein the actuating means further comprise an actuating arm having a first end and a second end, the first end is attached to the second link, the second end is attached to a shifting cable that provides compressive forces that displace the actuating arm.

11. The derailleur as recited in claim 10 wherein the first, second, third and fourth joints are elastic and provide a springlike resiliency causing the four bar linkage assembly to return to a first position when the compressive forces are removed from the actuating arm.

12. The derailleur as recited in claim 10 further comprising a spring disposed between the first end of the actuating arm and the first link, the spring providing tension between the first end of the actuating arm and the first link.

13. The derailleur as recited in claim 10 wherein the actuating arm is attached to an underside of the second link and pushes the link in a generally horizontal direction.

14. The derailleur as recited in claim 10 wherein the actuating arm is attached to an outer side of the second link and pulls the link in a generally horizontal direction.

15. A bicycle derailleur for causing a bicycle chain to shift from engagement with a first of multiple sprockets to engagement with a second of multiple sprockets in response to tension from a shifting cable, comprising:
- a fixing member for attaching the derailleur to a frame member of the bicycle, the fixing member having an upper portion and a lower portion;
- a chain guide engageable with the chain for physically moving the bicycle chain from a first position to a second position;
- at least one linking member for connecting the fixing member to the chain guide, wherein the fixing member, the chain guide and the linking member are a single unit; and
- actuating means for moving the chain guide between the first position and the second position, the actuating means is disposed between the fixing member and the chain guide.

16. The bicycle derailleur recited in claim 15 wherein the fixing member is comprised of a portion of flexible tubing including a slit opening for affixing the tubing to a frame member of the bicycle.

17. The bicycle derailleur recited in claim 16 wherein the flexible tubing has a first clamping arm and a second clamping arm, the slit is formed longitudinally in the tubing between the first and second clamping arms, the slit providing the first clamping arm with a first open edge and providing the second clamping arm with a second open edge, and a flange formed at each of the first and second open edges.

18. The bicycle derailleur recited in claim 15 wherein the chain guide is generally U-shaped and comprises a bridge member having a first end and a second end, a first side member integral with the first end of the bridge member and disposed normal thereto, and a second side member integral with the second end of the bridge member and disposed normal thereto, the second side member having an outer surface and an inner surface.

19. The bicycle derailleur recited in claim 18 wherein the linking member is a four bar linkage comprising:
- a first link including a lip formed from the upper portion of the fixing member, the lip having a distal end portion;
- a second link including a first actuating member disposed between the distal end portion of the lip and the first end of the bridge member;
- a third link including a second actuating member disposed between the lower portion of the fixing member and the outer surface of the second side member; and a fourth link including the chain guide.

20. The bicycle derailleur recited in claim 19 wherein the first, second, third and fourth links are of one-piece construction, formed integrally with each other.

21. The bicycle derailleur recited in claim 19 wherein the first second and third links are of one-piece construction, formed integrally with each other, and the fourth link is attached to the second and third links.

22. The bicycle derailleur recited in claim 19 wherein the convergence of the distal end of the lip and the first actuating link comprises a first elastic joint, the convergence of the first actuating link and the first end of the bridge member comprises a second elastic joint, the convergence of the second end of the flexible tubing and the second actuating link comprises a third elastic joint, and the convergence of the second actuating link and the outer surface of the second side member comprises a fourth elastic joint.

23. The bicycle derailleur recited in claim 22 wherein the first, second, third and fourth elastic joints are formed by a reduction in cross section of the first and second actuating links, and as such are bendable.

24. The bicycle derailleur recited in claim 19 wherein the actuating means is comprised of a rigid, U-shaped actuating arm having a first portion and a second portion, the second portion is attached to the second link.

25. The bicycle derailleur recited in claim 24 wherein the actuating arm further includes a side portion formed from one side of the second portion of the actuating arm, and a leg portion disposed normal to the side portion.

26. The bicycle derailleur recited in claim 25 wherein the actuating means further includes a spring member disposed between the first link and the second portion of the actuating arm.

27. The bicycle derailleur recited in claim 22 wherein the shifting cable is attached to the second portion and tension from the shifting cable causes the second portion to move in a downward direction in response thereto, the movement of the second portion causes a concomitant upward and outward movement in the first portion, the movement of the first portion causes the chain guide to move outward in a horizontal direction.

28. The bicycle derailleur recited in claim 27 wherein the actuating means further includes a spring member disposed between the first link and the second portion of the actuating arm, and, when the tension from the shifting cable is released, the spring member decompresses causing the second portion to move upward, away from the lip, the first portion moving inward in response to the upward movement of the second portion, and the chain guide moving inward in a horizontal direction in response to the movement of the first portion.

29. The bicycle derailleur recited in claim 27 wherein the downward movement of the second portion is limited by an outer stop adjusting screw, the outer stop adjusting screw including a first cylindrically shaped stem having a first end and a second end, the second end is attached to a first screw head, the first stem is disposed through an aperture proximate the second distal end of the second portion of the first end of the first stem engaging the linking member to limit the downward movement of the second portion.

30. The bicycle derailleur recited in claim 28 wherein the upward movement of the second portion is limited by an inner stop adjusting screw, the inner stop adjusting screw including a second cylindrically shaped stem having a third end and a fourth end, the fourth end is attached to a second screw head, the second stem is disposed through an aperture in the linking member, the third end of the second stem engaging the leg portion to limit the upward movement of the second portion.

31. The bicycle derailleur recited in claim 15 wherein the actuating means for the chain guide is provided by the elastic deformation of a spring molded integral with the base.

32. The bicycle derailleur recited in claim 31 wherein the spring is formed by elastic joints.

* * * * *